DEVELOPMENT OF ELECTROSTATIC IMAGES

Original Filed Oct. 17, 1966 2 Sheets-Sheet 1

DEVELOPMENT OF ELECTROSTATIC IMAGES

Original Filed Oct. 17, 1966 2 Sheets-Sheet 2

United States Patent Office

Re. 27,260

Reissued Dec. 28, 1971

27,260

DEVELOPMENT OF ELECTROSTATIC IMAGES

Alfred K. MacKenzie, Wayland, Mass., assignor to Dennison Manufacturing Company, Framingham, Mass.

Original No. 3,359,945, dated Dec. 26, 1967, Ser. No. 587,198, Oct. 17, 1966. Application for reissue Jan. 27, 1969, Ser. No. 822,065

Int. Cl. B05b *5/02*

U.S. Cl. 118—637 1 Claim

Matter enclosed in heavy brackets [ ] appears in the original patent but forms no part of this reissue specification; matter printed in italics indicates the additions made by reissue.

ABSTRACT OF THE DISCLOSURE

Apparatus for developing electrostatic images on a sheet of material comprising means for feeding the sheet edgewise through a pool of developer with metallic members in close juxtaposition to opposite sides of the path of sheet through the pool, the member on the image side of the sheet comprising a screen, and means for circulating developer through the screen to the sheet.

Figure 2:
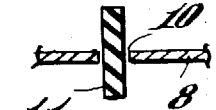

In developing electrostatic images on paper or other sheet material it has been proposed to feed the material along a path which dips into a tray of developing liquid with the latent image on the upper side of the material, but difficulty has been experienced in obtaining contrasty prints without background cloudiness, particularly in high-speed copiers. Also difficulty has been experienced in drying the developed material uniformly throughout the width of the sheet.

Objects of the present invention are to intensify the developed images without producing background cloudiness, and to dry the paper uniformly and economically.

In one aspect this invention involves the discovery that the images may be intensified by providing upper and lower metallic members in the pool above and below the sheet material, the members having faces opposed to the upper and lower surfaces of the sheet material respectively and extending in close juxtaposition to the surfaces throughout substantially the width of the sheet material, the two metallic members cooperating to produce results which neither can produce without the other. Preferably the members extend along the path of the sheet material in parallelism therewith. In the preferred embodiment the apparatus comprises means for supplying developer to the pool above said upper metallic member, the tray has drain openings in its bottom and the upper metallic member comprises a screen so that the developer may flow through the screen to the sheet material and thence through the drain openings. By flowing the developer through the screen there is no tendency for the screen to clog.

In another aspect the apparatus comprises a tray for a pool of developing liquid, means for guiding the sheet material edgewise along a predetermined path through the pool, a metal screen disposed along one side of said path in parallel juxtaposition thereto, said tray having an inlet above the screen, and means for circulating developer through said inlet and screen and thence out of the tray. Preferably the screen is disposed above the aforesaid path and the tray is metal.

In a further aspect the apparatus comprises means for guiding copy material along a predetermined path, means at one location along the path for exposing the material, means at a following location for wetting the material with developer, and a dryer at a following location for drying the material, the dryer comprising means for applying to the margins of the material at opposite sides of the path more heat than is applied between the margins.

After development it is customary to squeegee the paper between rollers in order to remove superficial liquid and this invention also involves the discovery that the liquid which accumulates in the nip of the rollers flows laterally to the margins of the sheets and leaves the margins wetter than the intermediate zone of the paper. This has resulted either in incomplete drying of the paper or the use of more heat than is necessary to dry the paper. By applying more heat to the margins of the paper than to the middle the paper is dried uniformly throughout its width with minimum heat.

Figure 3:
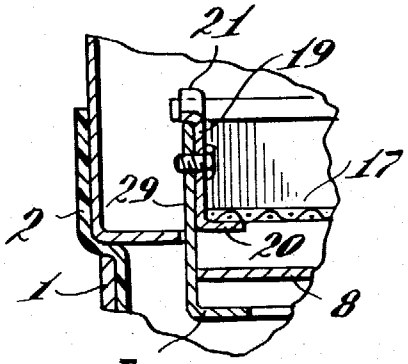
Figure 1:
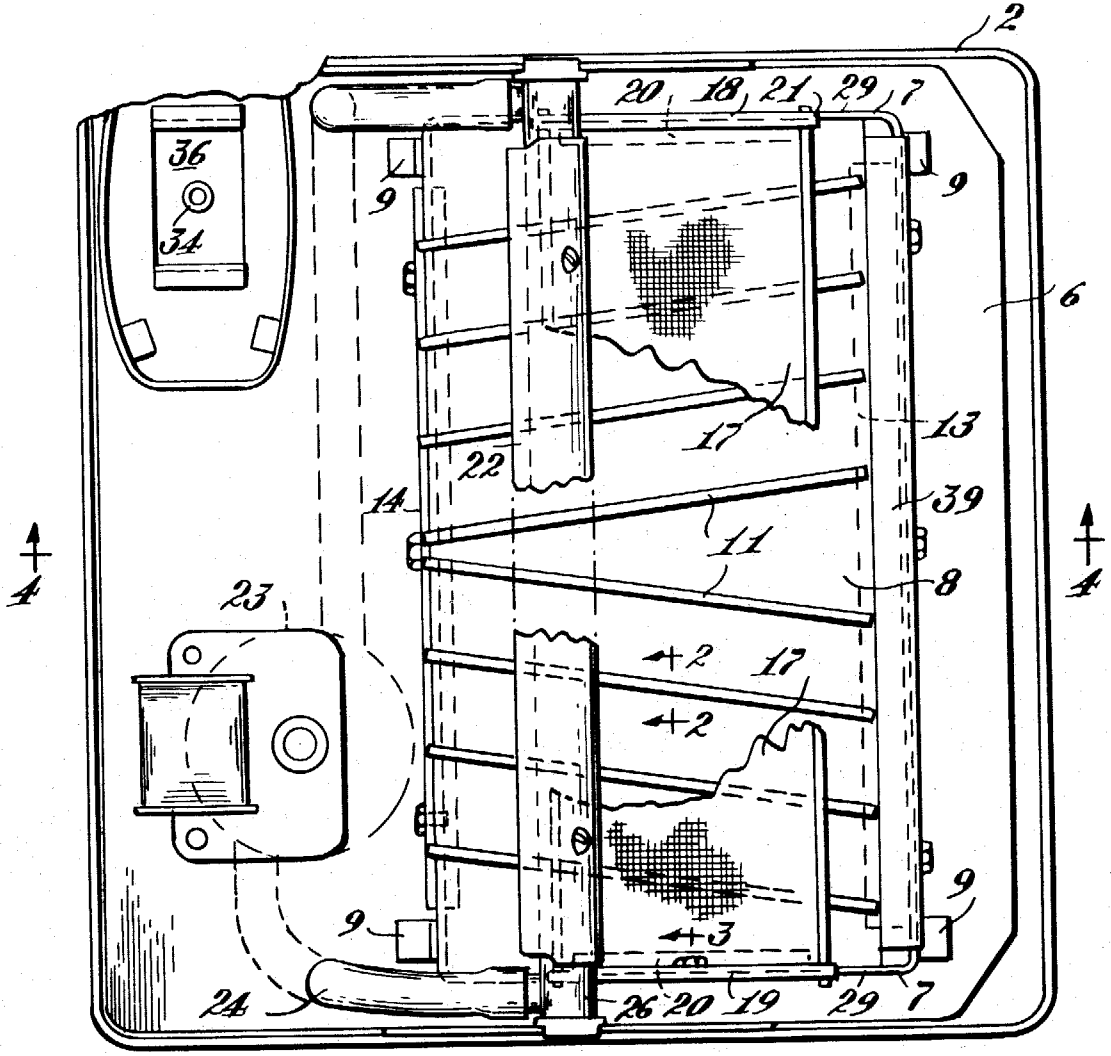
Figure 4:
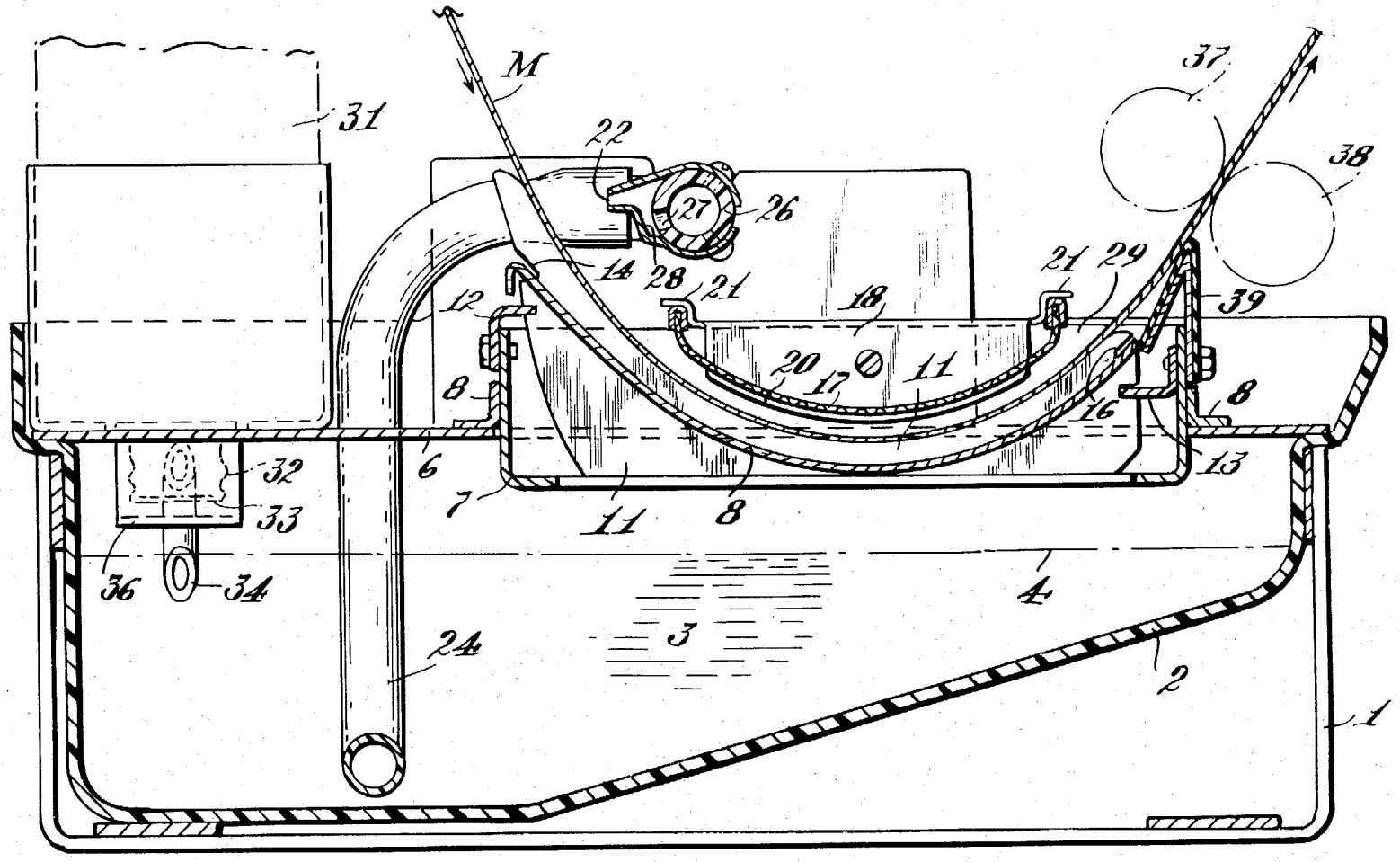

For the purpose of illustration a typical embodiment of the invention is shown in the accompanying drawings in which FIG. 1 is a plan view with parts broken away; and FIGS. 2 to 4 are sections on lines 2—2, 3—3 and 4—4 of FIG. 1, respectively.

The particular embodiment of the invention chosen for the purpose of illustration comprises a base 1, a tank 2 supported on the base, the tank containing developer 3 up to the level 4, and having a cover 6 provided with an opening in which a support 7 is mounted by means of bracket 9. In the support 7 is mounted a tray 8. In its bottom the tray has slots 10 and disposed in the slots are guides 11, the slots and guides extending obliquely to the median line 4—4 of the tray. The guides are mounted on the support 7 by brackets 12 and 13 which extend into recesses in the ends of the guides as shown in FIG. 4. The tray 8 is supported on the guides as shown at 14 and 16 in FIG. 4. Clearance between the guides and the edge of the slots permits developer to drain out of the tray (FIG. 2). The upper edges of the guides are parallel to the bottom of the tray and both are concave as shown in FIG. 4. The upper edges of the guides 11 determine the path of the exposed sheet material M through the tray (FIG. 4).

Disposed above the aforesaid path in close parallelism therewith is a metal screen 17 supported on the ends of the tray 8 by brackets 18 and 19, having flanges 20 extending under the ends of the screen, and ears 21 overlapping the upper edges of the screen.

As the material M approaches the tray 8 it is sprayed with developer through a nozzle 22 which may have a slot or a series of apertures extending across the width of the material. The developer is supplied to the nozzle from tank 2 by a pump 23 through conduit 24 and tube 26. The outlet 27 from the tube to the nozzle, which may comprise a slot or a series of apertures, is directed toward a wall 28 in the nozzle for the purpose of producing turbulence and thereby causing the stream of developer delivered by the nozzle to be distributed uniformly across the sheet M. Developer is pumped into tray 8 faster than it can drain through the slots 10 so as to maintain the tray full, the excess flowing over the ends 29 of the tray.

The developer in tank 2 is maintained at the level 4 from an inverted bottle 31 having a neck 32 extending through an opening in cover 6. The bottle is sealed with foil 33 which, when the bottle is inserted, is punctured by a tube 34 mounted on a bracket 36 (FIG. 4).

After leaving the pool of liquid in the tray 8 the developed material M passes between squeegee rolls 37–38 which may also serve to feed the material through the tray. Between the tray exit and the roll is a V-shaped guide 39 (FIG. 4) which guides the material flatwise into the nip between the rolls so that the material does not tend to wrinkle.

From the foregoing it will be understood that in passing through the developer the back of the material engages only the guides 11 and 39 and the image side contacts nothing. By making the guides 11 and 39 of material having the same triboelectric characteristics as the material M, the usual tendency to mark the back of the material is iminated. If the material M is paper, as usual, the guides ay be formed of vulcanized fiber, as described and aimed in copending application Ser. No. 587,257 filed on 'en date herewith.

By placing the two metallic members 8 and 17 as close possible to the material M without touching, they co-erate to produce intensification of the developed images ithout producing background cloudiness, the effect be-g greater than the sum of the effects of the members ed alone.

While one desirable embodiment of the invention has rein been disclosed by way of example, it is to be derstood that the invention is broadly inclusive of any d all modifications falling within the terms of the pended claims.

I claim:

1. For developing electrostatic images on a sheet of aterial, apparatus comprising a container for a pool developer, means for guiding the sheet through the ol along a predetermined path which dips into the ol with the image side of the sheet facing upwardly, per and lower metallic members in the pool juxta-sed to the upper and lower sides of the path respec-ely, the upper member being perforate, [and] *means r flowing developer downwardly through the perforate ember to the image side of the sheet,* the two metallic embers being disposed as close as possible to the mate-al without touching [.], *and dielectric guides for pre-nting the sheet of material from touching the lower etallic member.*

[2. Apparatus according to claim 1 wherein said up-r perforate member is a fine screen, said apparatus further comprising dielectric guides for supporting the sheet out of contact with said lower member and a nozzle for applying a stream of developer uniformly across the image side of said sheet in advance of said pool along said path.]

References Cited

The following references, cited by the Examiner, are of record in the patented file of this patent or the original patent.

UNITED STATES PATENTS

| | | | |
|---|---|---|---|
| 3,103,153 | 9/1963 | Limberger | 117—37 X |
| 3,139,808 | 7/1964 | Ritzerfeld et al. | 117—37 X |
| 3,168,021 | 2/1965 | Levene | 118—637 X |
| 3,169,887 | 2/1965 | York | 118—637 |
| 3,202,526 | 8/1965 | Ostensen | 118—637 X |
| 3,245,330 | 4/1966 | Okishima | 118—637 X |
| 3,382,763 | 5/1968 | Bruning | 117—37 UX |
| 3,368,525 | 2/1968 | Sacre | 117—37 |

FOREIGN PATENTS

| | | |
|---|---|---|
| 919,919 | 2/1963 | Great Britain. |

OTHER REFERENCES

Crawford, T. M.; IBM Technical Disclosure Bulletin, vol. 8, No. 4, p. 527.

PETER FELDMAN, Primary Examiner

U.S. Cl. X.R.

117—37 LE